United States Patent
Engel

[15] 3,688,985
[45] Sept. 5, 1972

[54] PLASTIC ARTICLE OF MANUFACTURE IMPREGNATED WITH VOLATILE MATTER

[72] Inventor: Walter H. Engel, 87 Southport Woods Drive, Fairfield, Conn. 06430

[22] Filed: Dec. 9, 1970

[21] Appl. No.: 96,354

[52] U.S. Cl. ..................239/54, 239/34, 55/159, 131/9, 252/522, 128/270, 128/185, 161/30, 260/2.5 R, 260/2.5 F, 260/2.5 HB, 260/2.5 AK, 424/15, 424/16, 424/27, 424/39, 424/76, 424/78, 424/83
[51] Int. Cl. ........A61l 9/04, A24f 25/00, A01n 17/12
[58] Field of Search..............260/2.5 R; 117/138.8 NA, 121.2; 252/522; 239/53, 54, 6, 34; 424/16, 27, 19

[56] References Cited

UNITED STATES PATENTS

| 3,567,119 | 3/1971 | Wilbert et al.................239/34 |
| 2,169,055 | 8/1939 | Overshiner..................239/54 |
| 3,400,890 | 9/1968 | Gould.....................260/2.5 R |
| 3,520,949 | 7/1970 | Shepherd et al. ........260/2.5 R |
| 2,812,767 | 11/1957 | MacHenry................131/10.9 |
| 3,470,883 | 10/1969 | Shepherd et al. .......131/269 X |
| 3,520,949 | 7/1970 | Shepherd et al...........260/857 |

OTHER PUBLICATIONS

Wentworth, Bernard, Avian Birth Control Potentialities with Synthetic Grit. Nature 220: 1,243– 1,245 (Dec. 1968)

Primary Examiner—Murray Tillman
Assistant Examiner—Wilbert J. Briggs, Sr.
Attorney—Arthur T. Fattibene

[57] ABSTRACT

This disclosure is directed to an article of manufacture comprising of preformed synthetic water insoluble resins which may be either soluble or insoluble in an organic solvent that is subsequently impregnated with a volatile substance by contact with an aqueous emulsion of an essential oil and a surfactant wherein the impregnated resin article with gradually yield the volatile substance in a chemically unchanged, dry state to the surrounding atmosphere over a considerable period of time. The impregnated volatile substance may be either a fragrance, a flavor, or a combination of both, a sanitizing agent, or a medicinal agent.

11 Claims, 5 Drawing Figures

PATENTED SEP 5 1972 3,688,985

INVENTOR.
WALTER H. ENGEL
BY
*Arthur T. Matthews*
ATTORNEY

PLASTIC ARTICLE OF MANUFACTURE IMPREGNATED WITH VOLATILE MATTER

An apparatus by which the method can be performed comprises a vessel which is preferably closed for containing the stable emulsion. An access opening is provided for inserting the synthetic water insoluble preformed resin thereinto and an egress opening is provided for effecting the removal of the impregnated resin therefrom. A drying means may be associated with the apparatus for effecting the drying of the removed resin to render it dry to the touch. In one form of the invention a squeegee means or wiper is disposed adjacent the egress opening for removing the excess emulsified solution from the impregnated resin as it is being withdrawn from the emulsion. Cooperatively associated adjacent the egress and the associated squeegee or wiper is a drying roller to render the impregnated resin dry to the touch. Alternately a centrifuge may be utilized to effect the drying of the impregnated resin article.

PROBLEM AND PRIOR ART

Heretofore, as disclosed in my British Pat. No. 599,237 granted Mar. 8, 1949, it was thought that synthetic resins could be impregnated with a volatile matter, e.g., an essential oil only during the formation of the synthetic resin. This was attained by dispersing resin in a plasticizer including an essential oil which was gelled by heat to form a given article, e.g., a sheet or membrane, or the like. However, essential oils when heated to gelling temperatures would break down; thereby resulting in such a change in the chemical properties of the essential oil, that they would no longer be useful for the intended purpose; such as, for example, the retention of their fragrance. Thus when essential oils, used in forming of synthetic resins, were heated to 150 degrees centigrade; they would be definitely spoiled particularly as to their fragrance. Essential oils, either natural or synthetic, when not subjected to the heat of forming retain all of their properties, and in particular their delicate fragrance. Thus the problem which I have become aware of is whether or not a synthetic resin could be impregnated with a volatile substance, e.g., an essential oil at temperatures below that of the known forming temperatures of synthetic resin compositions, and which would be capable of yielding the volatile matter in a chemically unchanged form to the surrounding atmosphere in a virtually dry state.

OBJECTS

An object of this invention is to provide a preformed synthetic resin which is dry to the touch containing a volatile matter which is gradually yielded in a chemically unchanged and dry state to the surrounding atmosphere over a considerable period of time.

Another object is to provide an apparatus for impregnating a preformed synthetic article with yieldable volatile matter.

Another object is to provide an improved article of manufacture for disseminating a fragrance within a confined area, e.g., a room or the like.

Another object is to provide an improved article of manufacture for dispensing a medicinal vapor in a sick room or the like.

BRIEF SUMMARY OF THE INVENTION

The foregoing objects and other features and advantages are obtained by forming a stable aqueous emulsion of a preferred essential oil with the help of a surfactant. Preferably the emulsion is contained within a closed vessel and a supply of a preformed synthetic resin in the form of a thin sheet, web, fiber or the like, is brought into intimate contact with the emulsion. The preformed synthetic resin is maintained in intimate contact with the emulsion for a predetermined period of time. It has been discovered that once the synthetic resin has become saturated it can be maintained in contact with the emulsion for an indefinite period of time without disintegrating. During the period of intimate contact between the preformed resin article and the emulsion, the temperature of the emulsion is maintained at a temperature below the boiling point thereof, and preferably at ambient temperatures and pressures.

Upon removing the impregnated resin from contact with the emulsion upon the lapse of a predetermined period the resin article is dried so that it feels dry to the touch. The dried preformed resin article is thus impregnated with volatile matter which will gradually be released or yielded to the surrounding atmosphere in a chemically unchanged, dry state over a considerable period of time.

FEATURES

Another feature of the invention resides in the provision of a preformed water insoluble synthetic resin impregnated with a volatile substance which is releasably held thereby.

Other features and advantages will become more readily apparent when considered in view of the drawings in which.

DETAILED DESCRIPTION

Figure 1:
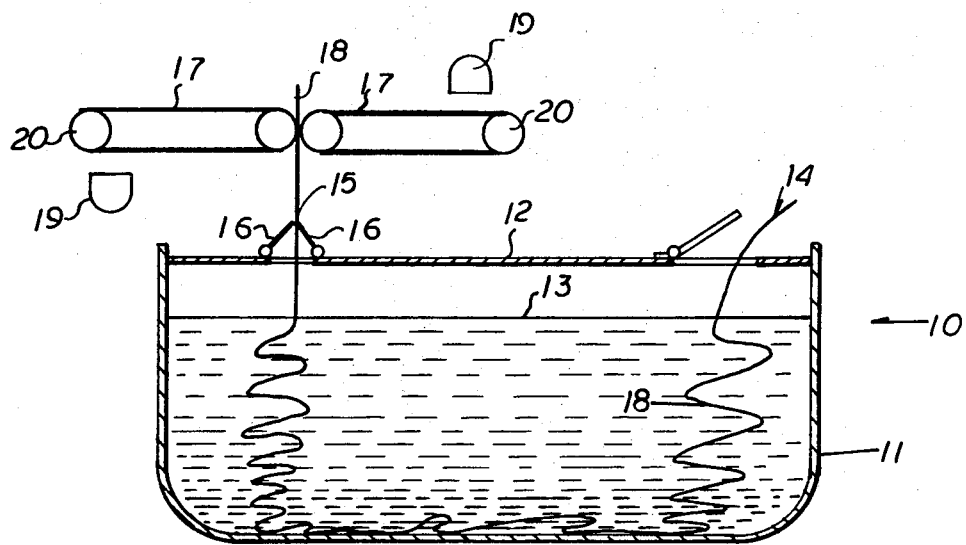
FIG. 1 is a diagrammatic sectional view of an apparatus for effecting the impregnation of a preformed synthetic resin, with a volatile substance in accordance with this invention.

This invention is directed to preformed or manufactured articles of synthetic resins which are subsequently impregnated with a volatile substance that is capable of being yielded to the surrounding environment in a chemically unchanged, dry state. Synthetic resins are herein defined as generally being water insoluble, and either soluble or insoluble in organic solvents, often specific to a particular resin; and to other preformed film forming materials or articles which are insoluble in both water and organic solvents.

The organic solvent soluble synthetic resins which can be impregnated in accordance with the invention to be disclosed include polyvinyl chloride, polyvinyl formal, polyvinyl acetal, many grades of polyvinyl acetate, polystyrene, polyurethane, particularly foamed, and many other known synthetic resins.

Water soluble film forming materials such as methyl cellulose, alginates, polyvinyl alcohol and the like, cannot be impregnated with volatile matter according to this invention.

For the purpose of this disclosure those materials which are subjected to impregnation with a volatile matter, e.g., an essential oil, shall be referred to as a synthetic water insoluble resin. Synthetic water insoluble resins may often be plasticized or preformed with such well known plasticizers as di-butyl phtalate, di-octyl phtalate, di-methyl citrate, di-butyl citrate, tri-cresyl phosphate, di-phenyl phosphate, the ricinoleates and many others in a manner well known to those skilled in the art. The resins thus plasticized are frequently subsequently molded, cast or extruded to define definite preformed articles of various shapes including sheets, webs, film, threads, variously shaped hollow and/or solidly formed articles, etc. Accordingly, this invention is particularly directed to impregnating such preformed or manufactured synthetic resins whether plasticized or unplasticized with a volatile matter, e.g., an essential oil, so that in their dry state, i.e., when dry to the touch, the essential oils are releasably held by the impregnated synthetic resin article so that the volatiles so held are gradually yielded to the surrounding atmosphere upon exposure thereto over a considerable period of time. The essential oils which may be impregnated in such preformed articles of water insoluble synthetic resins in accordance with this invention include the oils of various fruits, e.g., apple, cherry, pineapple, etc.; oils of various woods, e.g., cedar, pine, briar, and the like; oils of various flowers, e.g., roses, violets, tobacco flowers, and the like; and such other fragrances, e.g., peppermint, menthol, camphor, methyl salicylate, eucalyptus, parachlor benzene, acetates, and in general those essential oils, i.a., hydro carbons, alcohols, aldehydes, esters, terpenes, tars, phenols, thymols etc.

In accordance with this invention an emulsion of a desired essential oil is formed with the help of a suitable surfactant. In general, any emulsifier or surfactant is suitable. The choice of emulsifier depends upon the emulsifiability of the essential oil. The preferred particle size of the emulsion ranges between $1\mu$ and $10\mu$. In the lower particle sizes the emulsion should appear clear to the naked eye, but even at $10\mu$ only slight cloudiness can be observed. Emulsions having particle sizes exceeding $10\mu$ tend to be unstable and would require the application of constant stirring or agitation to insure impregnation. A nonionic emulsifier is desirable.

Surfactants which have been noted as being acceptable for forming the desired emulsion of essential oil, include polyoxyethylene ether, Empilane KL–20, Tween 85 and Teepol, the latter being tradenames of known surfactants. Other surfactants which can be used to form the emulsion may include commercial soaps and detergents of various kinds, turkey red oil, acacia, gums generally and particularly with ethyl, alcohol, propyl alcohol, lecithin etc.

To improve the stability of the emulsion formed, a protective colloid may be added, e.g., polyvinyl alcohol, alginates, and the like.

For example a characteristic formulation of a particular emulsion in accordance with this invention may be as follows:

200 parts essential oil
2,000 parts tap water
100 parts surfactant or 200 parts essential oil
2,000 parts tap water
100 parts surfactant
50 parts protective colloid wherein the essential oil may include any of those described hereandabove, or the equivalent thereof; the surfactant as described hereandabove or the equivalent thereof, and the protective colloid as described hereandabove or the equivalent thereof.

The water, surfactant and protective colloid content of the above preferred formulation can be increased or reduced within relatively wide limits to achieve a greater or lesser concentration, speed of evaporation and residue retention of the volatile matter in the final product.

In accordance with this invention a preformed or manufactured water insoluble resin article, either plasticized or unplasticized, in any shape or form is immersed or brought into intimate contact with the stable emulsion formulated as described herein, and retained in contact therewith for a predetermined time to effect the impregnation. The time required may be from 1 to 6 hours depending upon size, thickness and degree of impregnation desired. It has been noted that a film or sheet of preformed synthetic resin having a thickness of 0.006 to 0.004 inches is particularly suitable for impregnation. The immersion or contact of the formed synthetic resin article with the emulsion is preferably made under ambient temperatures and pressures. However, the application of some heat to the emulsion of e.g., 50° to 100° C, will not materially adversely effect the impregnation process. Thus when an organic solvent soluble synthetic resin material or body is immersed or brought in contact with the emulsion, as described, the finely emulsified volatile matter or particles enter the synthetic resins. In doing so some very small quantity of water is carried along therewith. It will be understood that the process can be interrupted at any time. However, when saturation has been reached, no further changes take place, and the material or article can be left indefinitely in contact with the emulsion without being adversely effected thereby.

Upon immersion or contact with the emulsion, the resin material, now impregnated, is removed and dried of any excess emulsion so that it feels dry to the touch. When so dried the synthetic resin is impregnated with volatile matter so that the volatile matter is releasably held thereby, thus yielding the volatile matter to the surrounding atmosphere in a chemically unchanged, dry state.

A specific formulation of an emulsion particularly applicable in making resin strips, e.g., polyvinyl chloride strips for bandage application at approximately 30°–40° C containing methyl salicylate in accordance with this invention is as follows:

200 parts methyl salicylate
2,000 parts tap water
100 parts polyoxyethelene ether By the present invention it is now economically feasible to make a bandage of preformed synthetic resin, e.g., polyvinyl chloride having methyl salicylate embodied in one part thereof and free of methyl salicylate in the remaining part thereof. With such a bandage, the methyl salicylate bearing portion is applied to the body requiring the medical application, and the second part free of methyl salicylate is used as a covering for the first part; thus prohibiting the escape of th methyl salicylate to the surrounding atmosphere and allowing more of the medicant to be directed to the body.

With the present invention, the manufacture of such a product can now be made by passing the portion of the bandage or polyvinyl strip through the emulsion containing the emulsified particles of methyl salicylate as the second part or portion is held outside the emulsion. In application the unimpregnated portion is useable as a cover for the impregnated portion of the strip when applied to a body. It will also be understood that it is also possible to immerse a part of the bandage or synthetic resin in one emulsion bath containing one volatile matter as described, and subsequently immersing other parts of the same strip in one or more baths containing different volatile matter, water and surfactant.

This invention further contemplates that preformed synthetic resins can be impregnated with various medicinal types of volatiles which when inhaled produce therapeutic effects on the body. In this embodiment, the preformed synthetic resins, impregnated with medicinal essential oils form a dry carrier for the volatile matter thus avoiding direct contact of the volatile substance with one's body, clothing, bed sheets or the like. A medicinal volatile impregnated in a preformed synthetic resin in accordance with this invention can be placed under a patient's pillow, or suspended in a sick room, or attached to one's clothing so that the volatile liberated thereby can be readily inhaled by the patient for its therapeutic effect. For example essential oils widely used to relieve symptoms of the common cold and other afflictions can be impregnated in a preformed synthetic resin carrier in a manner as described herein. Previously those therapeutic essential oils were dispersed in carriers such as petroleum jelly or the like. However, the application of such petroleum jelly based medicants to the body was messy with the added disadvantage that such petroleum jelly based medicants soiled any clothing coming in contact therewith. With the invention described the impregnation of therapeutic essential oils in a synthetic resin carrier completely eliminates the difficulty and/or disadvantages of petroleum jelly based volatiles. If desired, a preformed synthetic resin impregnated with medicinal volatile matter may be made pressure sensitive or adhesively coated on one side to provide a pressure sensitive article whereby it can be readily supported to a suitable support surface, e.g., a headboard of a patient's bed, or the body of a patient, etc.

Volatile matter incorporated, according to this invention, in a preformed synthetic resin, so that the carrying medium or resin remains, makes it now possible to use highly expensive and/or chemically very sensitive odoriferous matter, such as perfumes. The preformed synthetic resin carrier as described will also gradually yield such perfume type volatile matter. To facilitate the application or use of such scented synthetic resin sheets or the like, the sheet impregnated with such odoriferous perfume volatile matter may have one side thereof coated with a suitable pressure sensitive adhesive which may be covered by a protective backing. Thus, a piece of such coated impregnated sheet, e.g., 1 by one-half of an inch may be adhesively secured to an article of clothing, body, or other surface to be influenced by the volatile yielding therefrom. The impregnated sheet described may thus be used in lieu of perfumes utilized with conventional liquid carriers such as ethyl alcohol.

The present invention also contemplates the use of bactericides, fungicides and/or generally sanitizing agents impregnated in preformed synthetic resins by the method hereinabove described. Preformed synthetic resins incorporating such volatile substances open new uses thereof in the field of feminine hygiene when such agents are impregnated in a preformed synthetic resin sheet backed or formed with a pressure sensitive surface. In the case of internally worn tampons, the impregnated resin strip incorporating the sanitizing and/or perfuming agents, with or without pressure sensitive backing, may be incorporated to the inner layers of the tampon, wherein the volatile matter is released at a desired rate for at least as long as the tampon is in use, and even thereafter when it avoids too early decomposition due to bacterial activity.

The same effect can be achieved by placing properly impregnated or scented preformed synthetic resins to disposable or non-disposable baby napkins or diapers. In the case of panties, particularly baby panties, a strip of resin impregnated according to this invention and adhesively backed may be secured to the panty, preferably on the outside. It is also contemplated that the panty may be made in whole or in part of synthetic resin impregnated in accordance with this invention with the desired volatile matter.

A preformed synthetic resin when impregnated with cedar wood oil in a manner herein described can be satisfactorily used to impart a cedar flavor and/or aroma to cigars or tobacco products. A small strip or piece of impregnated synthetic resin, e.g., 1 inch square, when packed with the tobacco product in a paper or cardboard cigar box containing 5 to 10 cigars will impart to the tobacco product stored therein all the aroma or flavor that an actual cedar constructed box was heretofore able to impart thereto. A 2 inch square of preformed resin impregnated with cedar wood oil as herein described will satisfactorily service a standard box of 50 cigars.

In the invention thus far described the amount of volatile matter taken up by the preformed synthetic resin depends upon the amount of volatile matter actually emulsified or present as fine suspended particles in the emulsion bath. It has also been observed that the amount of volatile matter absorbed or taken up by the preformed synthetic resin also is dependent upon the surface of the synthetic resin exposed to the volatile matter actually emulsified or present as fine suspended particles in the emulsion, and time.

It is known that synthetic resins can be preformed with a very great number of fine, capillary type pores or canals interconnected one with another and/or extending from surface to surface, for instance by the starch process. Certain of such porous preformed synthetic resins may contain as much as 80 percent air. Thus such porous preformed synthetic resins therefore contain an extensive surface area which can be exposed to an essential oil aqueous emulsion. If an essentially unplasticized PVC sheet is made in such a manner as to contain a very great number of very fine, mostly capillary canals all interconnected (as by the starch process) such sheet can then be ground to powder or granular particle size wherein the individual particle sizes are made larger than the diameter of the canals contained therein. In this manner every particle is in fact transpierced by one or more, or depending on its size, by very many small diameter canals. These preformed particles are then impregnated with a desired volatile, as herein described, whereby the canals thereof fill with water, particularly when a surfactant is added to the water. Because of the micro size pores or canals formed in the particles, they will retain the water, yet render resultant PVC powder to appear quite dry, although the particles may contain as much as 80% water. Also the free flowing characteristic of such powder is not substantially impaired thereby.

A water insoluble synthetic resin when impregnated in a manner described with essential oils of a particular flower fragrance is particularly applicable for imparting a given fragrance to flowers, whether cut, potted or artificial. In the case of cut flowers, a suitable impregnated piece of synthetic resin may be located within the bouquet of cut flowers so that the yielding dry aroma will appear as eminating from the cut flowers.

In the case of a potted plant a piece of synthetic resin impregnated as described may be embodied in the soil just beneath the surface thereof.

In the case of artificial flowers, the impregnated resin may be shaped or made part of an artificial flower; wherein the volatile yielded thereby will eminate therefrom.

An apparatus by which the method of impregnating a synthetic resin, preformed to a film or sheet, with a volatile matter can be carried out as illustrated in FIG. 1. As shown, therein, the apparatus 10 comprises a vessel 11 which is preferably closed by a suitable closure 12, for containing the emulsion bath 13, as hereinbefore described. An access opening 14 is provided in the closure 12 to provide an access through which the preformed synthetic resin 18 may be introduced into the emulsion bath 13.

An egress 15 is provided by which the synthetic resin may be removed after it has become impregnated with the volatile matter of the emulsion bath 13. As shown, the egress 15 is defined by opposed squeegees or wipers 16 arranged to wipe any excess of the emulsion adhering to the synthetic resin as it is being withdrawn; the excess solution being returned to the bath 13.

Disposed downstreamwise of the wipers 16 are means for effecting the further drying of the synthetic resin to render the strip of resin dry to the touch. As shown the drying means comprises an endless conveyor 17, preferably disposed on either side of the impregnated resin strip. The surface of the endless conveyor is formed of a suitable absorbent material, e.g., a fabric or blotting paper. The arrangement of the conveyors is such that they are in contact with the resin sheet 18 as the sheet is passed therebetween. Thus as the drying conveying surfaces contact the surface of the resin sheet 18, the absorbent surface thereof will effect a drying action on the sheet 18. If desired a heater 19 may be applied against the surface of the conveyors 17 to effect the drying thereof. In this manner the conveyors may function as a drying means for a considerable period of time. The respective conveyors may be driven by connecting one of the end rollers or sprockets 20 to a suitable driving means, e.g., an electric motor. Preferably it is desired that the strip 18 being advanced between conveyors 17 travel at a speed greater than that of the conveyor.

In lieu of endless conveyor 17 it will be understood that drying rollers covered with a suitable absorbent surface may be substituted, the absorbent surface being made so as to be readily replaced when saturated. Thus as the impregnated resin is removed from the vessel, it is received virtually dry to the touch at the receiving station downstreamwise of the drying conveyors.

Figure 2:
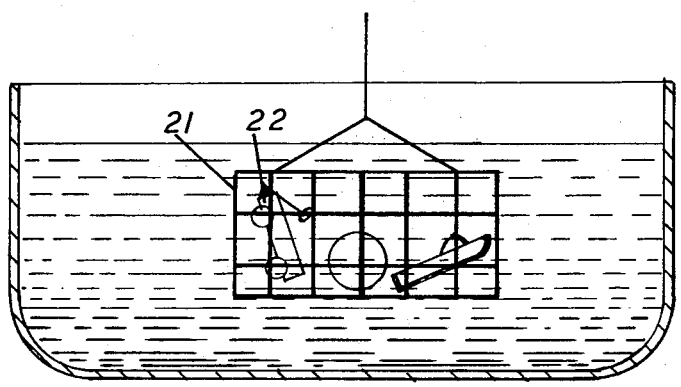
FIG. 2 is a modified form of the apparatus.

Synthetic resins not preformed to films or sheets but to three-dimensional bodies, including hollow bodies 22, granules, massive or porous, and powders, massive or porous, can be impregnated with volatile matter by immersing them into a stable emulsion containing the preferred essential oil or oils for a predetermined length of time, which may be unlimited, in a closed perforated or screened basket 21, made of material resistant to the emulsion, preferably stainless steel as seen in FIG. 2. The three-dimensional bodies 22 as characterized, when removed from the emulsion bath 13 may be rendered or made dry to the touch by centrifuging, whereby the emulsion removed thereby may be recirculated to the emulsion bath.

From the foregoing it will be noted that a preformed water insoluble synthetic resin can be readily impregnated with a volatile substance when in a stable aqueous emulsion wherein the volatile matter is releasably held thereby, and which volatile matter will gradually be yielded to its surroundings over a considerable period of time as a chemically unchanged, dry vapor and/or gas.

While a number of practical applications have been set forth herein as to possible uses of preformed impregnated synthetic resins manufactured by any process including that disclosed, it will be understood and appreciated that various other applications are rendered apparent to one skilled in the art. As the invention has been described with respect to particular embodiments it will be readily appreciated that variations and modifications may be made without departing from the spirit or scope of the invention.

What is claimed is:

1. An article of manufacture comprising a manufactured, preformed shape having imperforate portions of a water insoluble synthetic resin selected from the group consisting of polyvinylchloride, polyvinylacetate, polyvinyl formal, polyvinyl acetal, and polyurethane, and said imperforate portions being impregnated with an aqueous emulsion of an essential oil and surfactant, and which shape is dry to the touch and which gradually yields said essential oil in a chemically unchanged state as dry matter to the surrounding atmosphere over a considerable period of time.

2. The invention as defined in claim 1 wherein said essential oil is a fragrance producing substance.

3. The invention as defined in claim 1 wherein said essential oil is a flavor producing substance.

4. The invention as defined in claim 1 wherein said essential oil is a medicant.

5. The invention as defined in claim 1 wherein said essential oil is an anti-microbial substance.

6. The invention as defined in claim 1 wherein said preformed shape of synthetic resin comprises a preformed sheet of polyvinylchloride.

7. An article of manufacture comprising a manufactured, preformed shape of a water insoluble synthetic resin selected from the group consisting of polyvinylchloride, polyvinylacetate, polyvinyl formal, polyvinyl acetal, and polyurethane, and having preformed capillary pores formed in said shape, the imperforated portions of said shape being impregnated with an aqueous emulsion of an essential oil and surfactant; and which shape is dry to the touch and which gradually yields said essential oil in a chemically unchanged state as dry matter to the surrounding atmosphere over a considerable period of time.

8. The invention as defined in claim 1 wherein said preformed shape of synthetic resin comprises a sheet having a thickness ranging between 0.006 and 0.004 inches.

9. The invention as defined in claim 1 wherein said essential oils are selected from a group consisting of alcohols, hydro-carbons, aldehydes, esters, terpenes, and components of tar.

10. The invention as defined in claim 1 wherein said essential oil comprises cedar wood oil.

11. The invention as defined in claim 1 wherein said essential oil comprises methyl salicylate.

* * * * *